US007603226B2

(12) United States Patent
Henein

(10) Patent No.: US 7,603,226 B2
(45) Date of Patent: Oct. 13, 2009

(54) USING ION CURRENT FOR IN-CYLINDER $NO_x$ DETECTION IN DIESEL ENGINES AND THEIR CONTROL

(76) Inventor: Naeim A. Henein, 785 Lake Shore Rd., Grosse Pointe Shores, MI (US) 48236

( * ) Notice: Subject to any disclaimer, the term of this patent is extended or adjusted under 35 U.S.C. 154(b) by 392 days.

(21) Appl. No.: 11/464,232

(22) Filed: Aug. 14, 2006

(65) Prior Publication Data

US 2008/0040020 A1 Feb. 14, 2008

(51) Int. Cl.
*F02D 41/14* (2006.01)
*B60T 7/12* (2006.01)

(52) U.S. Cl. .................................................... 701/109

(58) Field of Classification Search ................. 701/108, 701/109, 114, 115; 60/274, 276, 285; 123/676, 123/703

See application file for complete search history.

(56) References Cited

U.S. PATENT DOCUMENTS

| | | | | |
|---|---|---|---|---|
| 4,308,519 | A | | 12/1981 | Garcea et al. |
| 4,359,893 | A | | 11/1982 | Kizler et al. |
| 4,663,717 | A | * | 5/1987 | Kobayashi et al. .......... 701/109 |
| 5,451,385 | A | * | 9/1995 | Hansel et al. ............ 423/213.5 |
| 5,652,520 | A | | 7/1997 | Kawamoto et al. |
| 5,734,094 | A | | 3/1998 | Matsubara et al. |
| 5,801,534 | A | | 9/1998 | Hohner et al. |
| 5,914,604 | A | | 6/1999 | Bahr et al. |
| 6,011,397 | A | | 1/2000 | Yasuda |
| 6,029,627 | A | | 2/2000 | VanDyne |
| 6,043,660 | A | | 3/2000 | Bahr et al. |
| 6,075,366 | A | | 6/2000 | Yasuda |
| 6,089,077 | A | | 7/2000 | Daniels et al. |
| 6,104,195 | A | | 8/2000 | Yoshinaga et al. |

(Continued)

FOREIGN PATENT DOCUMENTS

WO WO 2005/044382 5/2005

OTHER PUBLICATIONS

Magnus Glavmo, Peter Spadafora and Russell Bosch; "Closed Loop Start of Combustion Control Utilizing Ionization Sensing in a Diesel Engine"; SAE Technical Paper Series 1999-01-0549; Mar. 1-4, 1999; 9 pages; International Congress and Exposition, Detroit, Michigan.

(Continued)

*Primary Examiner*—Hieu T Vo
(74) *Attorney, Agent, or Firm*—Reinhart Boerner Van Deuren P.C.

(57) ABSTRACT

Presented is a technique that utilizes ion current to determine the concentration of nitrogen oxides ($NO_x$) produced in the combustion chamber(s) of diesel engines, on a cycle by cycle basis during the combustion of conventional petroleum-based fuels, other alternate fuels, and renewable fuels. The technique uses an ion current measuring circuitry, a calibration circuit and a signal processing circuit connected to the engine control unit (ECU). The ion current sensing circuitry is positioned in the chamber(s) of the engine, to measure the ion current produced during the combustion process. The calibration circuit utilizes $NO_x$ values measured in the exhaust port or manifold of the engine to calibrate the ion current signal. The calibrated ion current signal is fed into a processor that is connected to the ECU to adjust various operating parameters to improve the trade-off between $NO_x$ and other emissions, fuel economy, and power output.

25 Claims, 8 Drawing Sheets

U.S. PATENT DOCUMENTS

| | | | |
|---|---|---|---|
| 6,279,538 B1 | 8/2001 | Herweg et al. | |
| 6,311,672 B1 | 11/2001 | Morishita et al. | |
| 6,348,799 B1 | 2/2002 | Herweg et al. | |
| 6,375,828 B2 | 4/2002 | Ando et al. | |
| 6,502,391 B1 | 1/2003 | Hirota et al. | |
| 6,505,500 B1 | 1/2003 | Elgh et al. | |
| 6,550,312 B1 | 4/2003 | Hohner et al. | |
| 6,557,537 B2 | 5/2003 | Ikeda et al. | |
| 6,646,230 B2 | 11/2003 | Girlando et al. | |
| 6,666,069 B2 | 12/2003 | Raichle et al. | |
| 6,832,472 B2 * | 12/2004 | Huang et al. | 60/285 |
| 6,848,421 B1 | 2/2005 | Karau et al. | |
| 6,986,342 B2 | 1/2006 | Thomas | |
| 6,994,073 B2 | 2/2006 | Tozzi et al. | |
| 7,043,353 B2 | 5/2006 | Takemura et al. | |
| 7,089,922 B2 | 8/2006 | Lindner | |
| 2006/0016417 A1 | 1/2006 | Kuo et al. | |
| 2007/0079817 A1 | 4/2007 | VanDyne et al. | |

OTHER PUBLICATIONS

Heiko Kubach, Amin Velji, Ulrich Spicher and Wolfgang Fischer; "Ion Current Measurement in Diesel Engines"; SAE Technical Paper Series 2004-01-2922; Oct. 25-28, 2004; 18 pages; Powertrain & Fluid Systems Conference & Exhibition, Tampa, Florida.

Robert L. Anderson; "In-Cylinder Measurement of Combustion Characteristics Using Ionization Sensors"; SAE Technical Paper Series 860485; pp. 113-124.

Jürgen Förster, Andrea Lohmann, Manfred Mezger and Klaus Ries-Müller; "Advanced Engine Misfire Detection for SI-Engines"; SAE Technical Paper Series 970855; pp. 167-173.

D. Lundström and S. Schagerberg; "Misfire Detection for Prechamber SI Engines using Ion-Sensing and Rotational Speed Measurements"; SAE Technical Paper Series 2001-01-0993; Mar. 5-8, 2001; 8 pages; SAE 2001 World Congress, Detroit, Michigan.

P. O. Witze and R. M. Green; "Determining the Location of End-Gas Autoignition Using Ionization Probes Installed in the Head Gasket"; SAE Technical Paper Series 932645; Oct. 18-21, 1993; 23 pages; Fuels and Lubricants Meeting and Exposition, Philadelphia, Pennsylvania.

Jürgen Förster, Achim Günther, Markus Ketterer and Klaus-Jürgen Wald; "Ion Current Sensing for Spark Ignition Engines"; SAE Technical Paper Series 1999-01-0204; Mar. 1-4, 1999, 13 pages; International Congress and Exposition, Detroit Michigan.

Ingemar Andersson; "A Comparison of Combustion Temperature Models for Ionization Current Modeling in an SI Engine"; SAE Technical Paper Series 2004-01-1465; Mar. 8-11, 2004; 12 pages; 2004 SAE World Congress, Detroit Michigan.

Stefan Byttner, Ulf Holmberg and Nicholas Wickström; "An Ion Current Algorithm for Fast Determination of High Combustion Variability"; SAE Technical Paper Series 2004-01-0522; Mar. 8-11, 2004; 8 pages; 2004 SAE World Congress, Detroit, Michigan.

Axel Franke, Patrik Einewall, Bengt Johansson, Nicholas Wickström, Raymond Reinmann, Anders Larsson; "The Effect of In-Cylinder Gas Flow on the Interpretation of the Ionization Sensor Signal"; SAE Technical Paper Series 2003-01-1120; Mar. 3-6, 2003; 8 pages; 2003 SAE World Congress, Detroit, Michigan.

Viatcheslav Naoumov, Aleksey Demin, Andrey Sokolov; "Three-Zone Model of Combustion and Chemical Non-Equilibrium Ionization in the SI Engine"; SAE Technical Paper Series 2004-01-0622; Mar. 8-11, 2004; 10 pages; 2004 SAE World Congress, Detroit, Michigan.

* cited by examiner

USING ION CURRENT FOR IN-CYLINDER $NO_x$ DETECTION IN DIESEL ENGINES AND THEIR CONTROL

BACKGROUND

Diesel engines and other compression ignition engines are used to power light and heavy duty vehicles, locomotives, off-highway equipment, marine vessels and many industrial applications. Government regulations require the engines to meet certain standards for the exhaust emissions in each of these applications. Currently, the emission standards are for the nitrogen oxides $NO_x$, hydrocarbons (HC), carbon monoxide (CO), and particulate matter (PM). Government agencies and industry standard setting groups are reducing the amount of allowed emissions in diesel engines in an effort to reduce pollutants in the environment. The environmental emissions regulations for these engines are becoming more stringent and difficult to meet, particularly for $NO_x$ and PM emissions. To meet this challenge, industry has developed many techniques to control the in-cylinder combustion process in addition to the application of after treatment devices to treat the engine-out exhaust gases and reduce the tail-pipe emissions. The emissions targets for the new production engines are even lower than the regulated emissions standards to account for the anticipated deterioration of the equipment during the life time of the engine after long periods of operation in the field. For example, proposed regulations for new heavy duty engines require additional $NO_x$ and diesel particulate emission reductions of over seventy percent from existing emission limits. These emission reductions represent a continuing challenge to engine design due to the $NO_x$-diesel particulate emission and fuel economy tradeoffs associated with most emission reduction strategies. Emission reductions are also desired for the on and off-highway in-use fleets.

Traditionally, there have been two primary forms of reciprocating piston or rotary internal combustion engines. These forms are diesel and spark ignition engines. While these engine types have similar architecture and mechanical workings, each has distinct operating properties that are vastly different from each other. The diesel engine controls the start of combustion (SOC) by the timing of fuel injection. A spark ignited engine controls the SOC by the spark timing. As a result, there are important differences in the advantages and disadvantages of diesel and spark-ignited engines. The major advantage that a pre-mixed charge spark-ignited natural gas, or gasoline, engine (such as passenger car gasoline engines and lean burn natural gas engines) has over a diesel engine is the ability to achieve low $NO_x$ and particulate emissions levels. The major advantage that diesel engines have over pre-mixed charge spark ignited engines is higher thermal efficiency.

One reason for the higher efficiency of diesel engines is the ability to use higher compression ratios than spark ignited engines because the compression ratio in spark ignited engines has to be kept relatively low to avoid knock. Typical diesel engines, however, cannot achieve the very low $NO_x$ and particulate emissions levels that are possible with premixed charge spark ignited engines. Due to the mixing controlled nature of diesel combustion, a large fraction of the fuel exists at a very fuel rich equivalence ratio, which is known to lead to particulate emissions. A second factor is that the combustion in diesel engines occurs when the fuel and air exist at a near stoichiometric equivalence ratio which leads to high temperatures. The high temperatures, in turn, cause higher $NO_x$ emissions. As a result, there is an urgent need to control the combustion process, not only to reduce the engine-out emissions, but also to produce the exhaust gas composition and temperature that would enhance the operation of the after treatment devices and improve their effectiveness.

The control of the in-cylinder combustion process can be achieved by optimizing the engine design and operating parameters. The engine design parameters include, but are not limited to engine compression ratio, stroke to bore ratio, injection system design, combustion chamber design (e.g., bowl design, reentrance geometry, squish area), intake and exhaust ports design, number of intake and exhaust valves, valve timing, and turbocharger geometry. For any specific engine design, the operating variables can also to be optimized. These variables include, but are not limited to, injection pressure, injection timing, number of injection events, (pilot, main, split-main, post injections or their combinations), injection rate in each event, duration of each event, dwell between the injection events, EGR (exhaust gas recirculation) ratio, EGR cooling, swirl ratio and turbocharger operating parameters.

Many types of after treatment devices have been developed, or are still under development to reduce the engine-out emissions such as $NO_x$ and PM in diesel engines. The effectiveness of each of the after treatment devices depends primarily on exhaust gas properties such as temperature and composition including the ratio between the different species such as $NO_x$, hydrocarbons and carbon (soot). Here, also, the properties of the exhaust gases depend primarily on the combustion process.

The precise control of the combustion process in diesel engines requires a feed back signal indicative of the combustion process. Currently, the most commonly considered signal is the cylinder gas pressure, measured by a quartz crystal pressure transducer, or other types of pressure transducers. The use of the cylinder pressure transducers is limited to laboratory settings and can not be used in the production engine because of its high cost and limited durability under actual operating conditions.

BRIEF SUMMARY

Described herein is, among other things, an inexpensive direct indicator of $NO_x$ in the cylinder of compression ignition engines during the combustion process, which requires no or just minor modifications in the cylinder head and gives a signal that can be used to control the combustion process and engine-out exhaust gases, particularly $NO_x$, in diesel engines and the like.

In an embodiment, $NO_x$ emissions formed in a combustion chamber of a compression ignition engine is determined by receiving an ion current signal indicating the concentration of ions in the combustion chamber and determining the $NO_x$ emissions based upon a derived relationship between the ion current signal and the $NO_x$ emissions. The engine may be controlled based in part upon the derived $NO_x$ emissions.

The relationship is derived by receiving an ion current signal from an ion current sensor and $NO_x$ exhaust emissions data obtained from $NO_x$ emissions measuring equipment, comparing the ion current signal to the $NO_x$ emissions data, and fitting a function through the $NO_x$ emissions data and ion current data. This may be accomplished by creating a plot of the $NO_x$ emissions versus ion current magnitude and fitting a function through the plot. In one embodiment, the function is a volume fraction of $NO_x$ per unit of ion current.

The relationship between the $NO_x$ emissions and ion current is derived for each chamber of the compression ignition engine in one embodiment. This is accomplished by receiving an ion current signal indicating the concentration of ions in each of the cylinders and $NO_x$ emissions data and deriving the relationship that is, in one embodiment, a volume fraction of $NO_x$ per unit of ion current flowing in the one of the plurality of cylinders. Other functions may be derived for the relationship. For each cylinder, parameters for fuel injection, EGR (exhaust gas recirculation) rate and others are adjusted based upon the derived $NO_x$ emissions in the cylinder indicated by the ion current.

Additional features and advantages will be made apparent from the following detailed description of illustrative embodiments, which proceeds with reference to the accompanying figures.

BRIEF DESCRIPTION OF THE DRAWINGS

The accompanying drawings incorporated in and forming a part of the specification illustrate several aspects of the technologies described herein, and together with the description serve to explain the principles of the technologies. In the drawings.

While the techniques will be described in connection with certain embodiments, there is no intent to limit it to those embodiments. On the contrary, the intent is to cover all alternatives, modifications and equivalents as included within the spirit and scope of the invention as defined by the appended claims.

DETAILED DESCRIPTION

The apparatus and method described herein determines $NO_x$ emissions based upon the ion current produced during the compression process in compression ignition engines of different designs while running on conventional, alternate, or renewable diesel fuel without requiring the use of an in-cylinder $NO_x$ sensor or $NO_x$ measurement in the exhaust.

Figure 1:
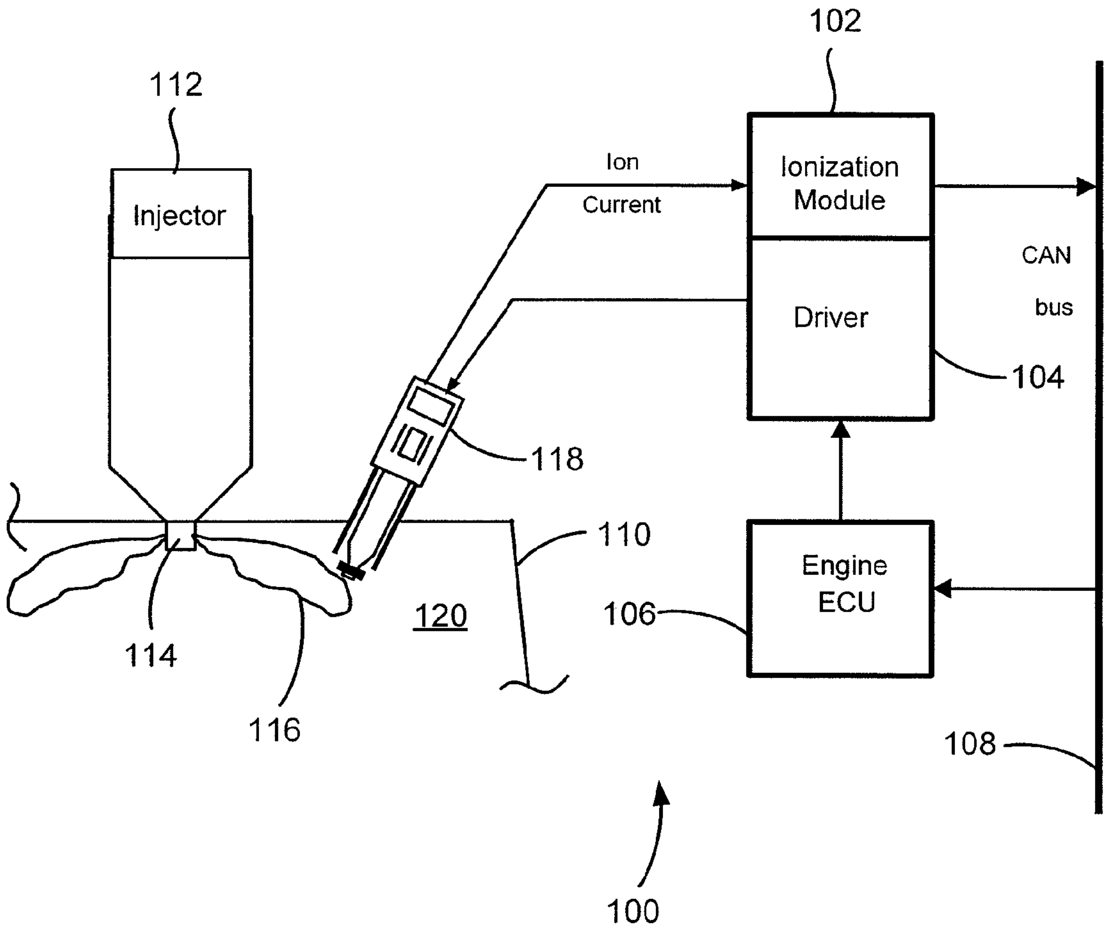
FIG. 1 is a schematic view of a representative environment in which the techniques may operate.

Referring initially to FIG. 1, a exemplary system 100 in which the present apparatus and method operates is shown. The system includes an ionization module 102, a driver 104, an engine electronic control unit (ECU) 106, and a diesel engine. The ionization module 102 communicates with the ECU 106 and other modules via, for example, the CAN (Controller Area Network) bus 108. While the ionization module 102, the driver 104 and the engine control unit 106 are shown separately, it is recognized that the components 102, 104, 106 may be combined into a single module or be part of an engine controller having other inputs and outputs. The components 102 and 106 typically include a variety of computer readable media. Computer readable media can be any available media that can be accessed by the components 102, 106 and includes both volatile and nonvolatile media, removable and non-removable media. The diesel engine includes engine cylinders 110, each of which has a piston, an intake valve and an exhaust valve (not shown). An intake manifold is in communication with the cylinder 110 through the intake valve. An exhaust manifold receives exhaust gases from the cylinder via an exhaust valve. The intake valve and exhaust valve may be electronically, mechanically, hydraulically, or pneumatically controlled or controlled via a camshaft. A fuel injector 112 injects fuel 116 into the cylinder 110 via nozzle 114. The fuel may be conventional petroleum based fuel, petroleum based alternate fuels, renewable fuels, or any combination of the above fuels. An ion sensing apparatus 118 is used to sense ion current and may also be used to ignite the air/fuel mixture in the combustion chamber 120 of the cylinder 110 during cold starts. Alternatively, a glow plug can be used to warm up the cylinder to improve the cold start characteristics of the engine and sense ion current.

The ion sensing apparatus 118 has two electrodes, electrically insulated, spaced apart and exposed to the combustion products inside the cylinder of diesel engines. It can be in the form of a spark plug with a central electrode and one or more side electrodes that are spaced apart, a glow plug insulated from the engine body where each of the glow plug and engine body acts as an electrode, a combined plasma generator and ion sensor, etc. The ion sensing apparatus 118 receives an electric voltage provided by driver 104 between the two electrodes, which causes a current to flow between the two electrodes in the presence of nitrogen oxides and other combustion products that are between the two electrodes. The driver 104 provides power to the ion sensing apparatus 118. The driver 104 may also provide a high energy discharge to keep the ion sensing detection area of the ion sensing apparatus clean from fuel contamination and carbon buildup. While shown separate from the fuel injector 112, the ion sensing apparatus 118 may be integrated with the fuel injector 112.

Figure 2:
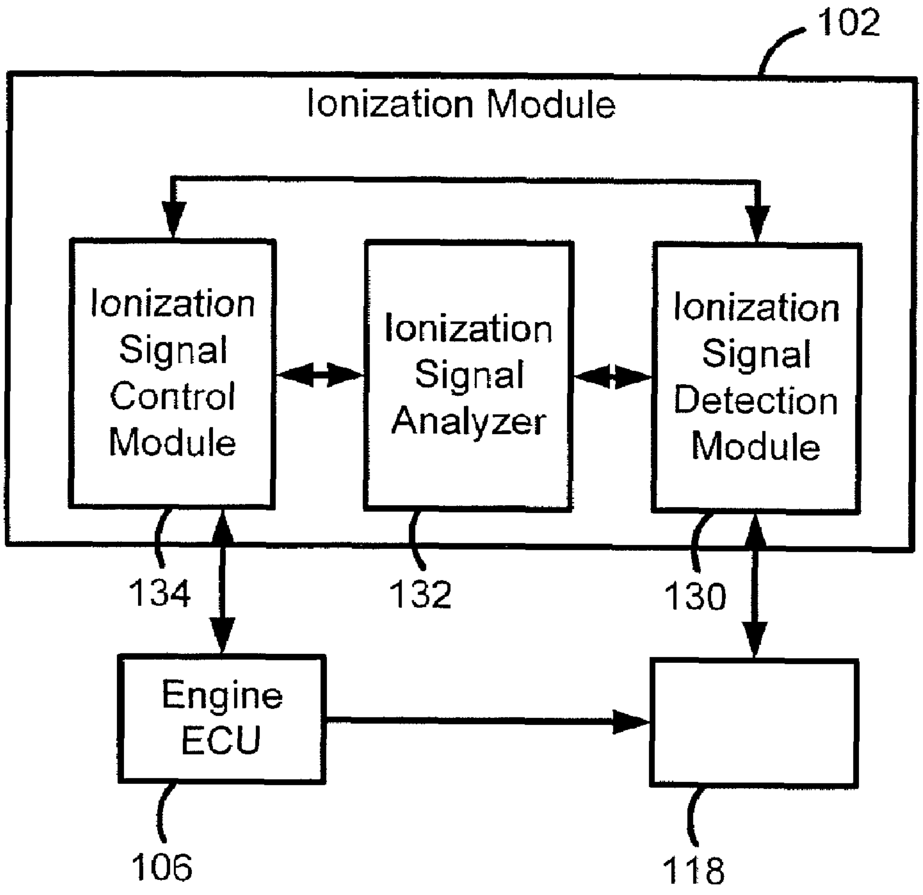
FIG. 2 is a block diagram view of an ionization module in which the techniques may be incorporated within.

The ionization module contains circuitry for detecting and analyzing the ionization signal. In the illustrated embodiment, as shown in FIG. 2, the ionization module 102 includes an ionization signal detection module 130, an ionization signal analyzer 132, and an ionization signal control module 134. In order to detect concentration of ions in a cylinder, the ionization module 102 supplies power to the ion sensing apparatus 118 and measures ionization current from ion sensing apparatus 118 via ionization signal detection module 130. Ionization signal analyzer 132 receives the ionization signal from ionization signal detection module 130 and determines the different combustion parameters such as start of combustion and combustion duration. The ionization signal control module 134 controls ionization signal analyzer 132 and ionization signal detection module 130. The ionization signal control module 134 provides an indication to the engine ECU 106 as described below. In one embodiment, the ionization module 102 sends the indication to other modules in the engine system. While the ionization signal detection module 130, the ionization signal analyzer 132, and the ionization signal control module 134 are shown separately, it is recognized that they may be combined into a single module and/or be part of an engine controller having other inputs and outputs. Returning now to FIG. 1, the ECU 106 receives feed-back from the ionization module and controls fuel injection 112, and may control other systems such as the air delivery system and EGR system, to achieve improved engine performance, better fuel economy, and/or low exhaust emissions.

Figure 3:
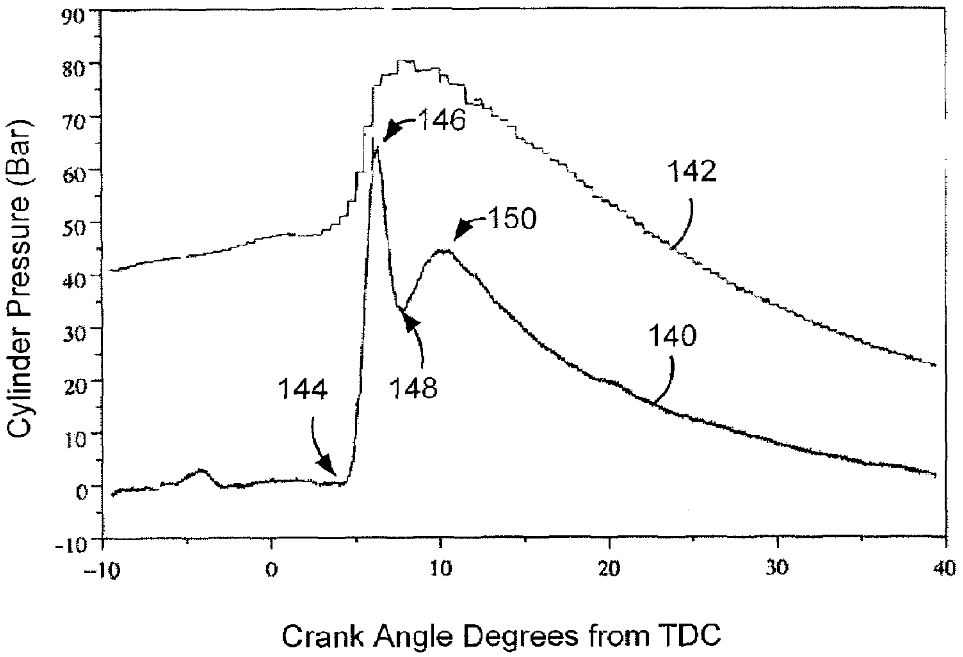
FIG. 3 is a graphical illustration of combustion pressure and ionization current versus engine piston crank angle.

The ion current signal can be correlated to the level of $NO_x$ emission and in-cylinder pressure produced during combustion. Turning now to FIG. 3, a sample of the ion current and the gas pressure measured in one of the cylinders of a 4-cylinder, 2 L, direct injection turbocharged diesel engine is shown. The operating conditions are 75 Nm torque, 1600 rpm, 40% EGR, and a dialed injection timing of 13° bTDC (before top dead center). The ion current trace 140 shows two peaks that cannot be explained by the findings in spark ignition engines, where the first peak is caused by chemi-ionization in the flame front, which is not the case in diesel engines, and the second peak is caused by thermal ionization. The gas pressure trace 142 shows clearly that autoignition started with a cool flame that caused a slight increase in the cylinder gas pressure. The energy released by the cool flame is known to be fairly small and causes a slight increase in the combustion gas temperature. The ions generated during this period are expected to be fairly low in concentration. At the end of the cool flame, the ion current starts to increase sharply at approximately a half crank angle degree bTDC (point 144).

In the sample shown, the ion current reaches a peak (point 146) after 3 CAD (crank angle degree) from its starting point. Up to this point, combustion occurs in the premixed combustion fraction of the charge. The amount of the charge that is burnt during this period and the corresponding rise in temperature depend on many factors including the total lengths of the ignition delay and the cool flame periods, the rate of fuel injection, and the rates of fuel evaporation and mixing with the fresh oxygen in the charge. The ion current reaches a fairly high peak in about three crank angle degrees, or about 0.3 ms, after which it dropped, reached a bottom value (point 148), started to increase again at a slower rate and reached a second peak (point 150) at 10° aTDC (after top dead center). This indicates that the rate of formation of the ions leading to the second peak is much slower than that for the first peak. The slower rate of formation of ions leading to the second peak can be attributed to the slower rate of mixing of the unburned fuel with the rest of the charge, the drop in temperature of the combustion products caused by the piston motion in the expansion stroke, and to the increase in the cooling losses to the cylinder walls. Since the ionization in the second peak follows the same characteristics as the mixing-controlled and diffusion-controlled combustion fractions, it is reasonable to consider that it is caused by this combustion regime. Here the ionization is caused by a combination of the chemi-ionization and the thermal ionization. Following the second peak, the ionization signal decreases at a slow rate, caused by the gradual drop in the gas temperature during the expansion stroke. In this figure, the ionization was detected during about 30 to 40 crank angle degrees.

The rates of formation of both the ions and $NO_x$ depend on many engine design parameters and the properties of the fuel used to run the engine. The design parameters may vary from one engine to another and include, but are not limited to, the following: compression ratio, bore to stroke ratio, surface to volume ratio of the combustion chamber, inlet and exhaust ports and valves design, valve timing, combustion chamber design, injection system design parameters and cooling system design parameters. The injection systems parameters include, but are not limited to, injection pressure, nozzle geometry, intrusion in the combustion chamber, number of nozzle holes, their size, and shape and included spray angle. The important fuel properties that affect the combustion process, $NO_x$ formation and ion current include hydrogen to carbon ratio, distillation range, volatility and cetane number. As a result, variations in the design parameters from one engine to another and in the fuel properties affect the cylinder gas temperature and pressure, mixture formation, and the distribution of the equivalence ratio in the combustion chamber, all of which affect the formation of ions and $NO_x$.

Figure 4:
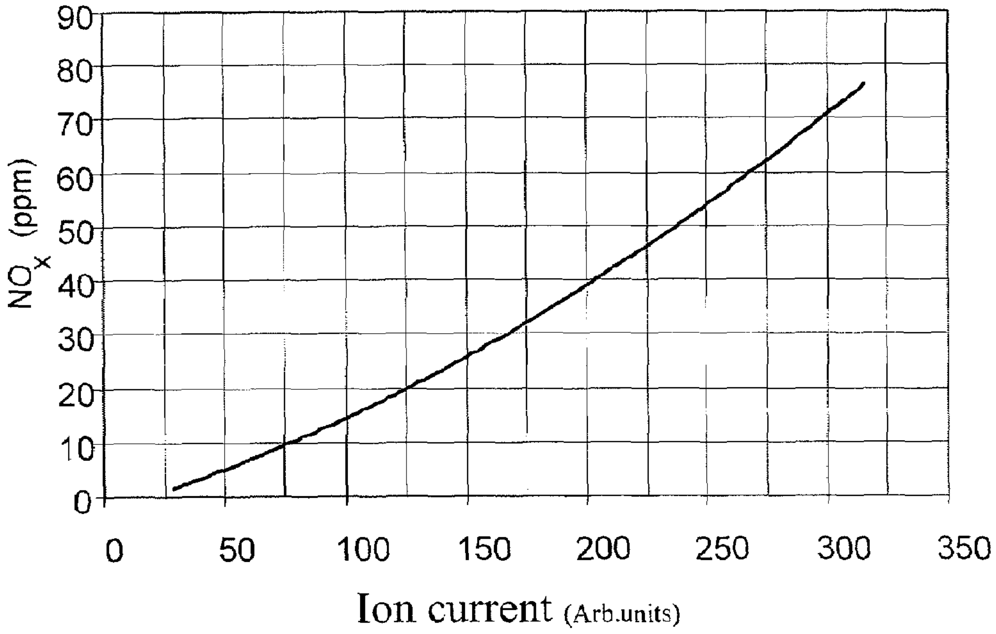
FIG. 4 is a graph illustrating an example of a plot of the relationship between $NO_x$ emissions, plotted as volume fraction in parts per million, and ion current.

From the foregoing, it can be seen that ion current can be used to determine $NO_x$. It can also be seen that the ion current signal should be calibrated with respect to $NO_x$ emissions in each engine make and type and for each of the fuel types used. Turning now to FIG. 4, a sample of the calibration of an ion current signal in a multi-cylinder engine is shown. FIG. 4 is a plot of $NO_x$ engine-out emissions (volume fraction in parts per million) versus the summation of the peaks of the ion currents measured in the four cylinders at 1600 rpm, under a wide range of operating conditions: EGR: 40%, 45%, 50% and 55%; Torque: 25 Nm, 50 Nm and 75 Nm; and injection timing that was varied between 11° bTDC and 25° bTDC, depending on the load and EGR percentage. It can be clearly seen from the plot that there is a relationship between the magnitude of the ion current peaks and the level of $NO_x$ emissions.

Figure 5:
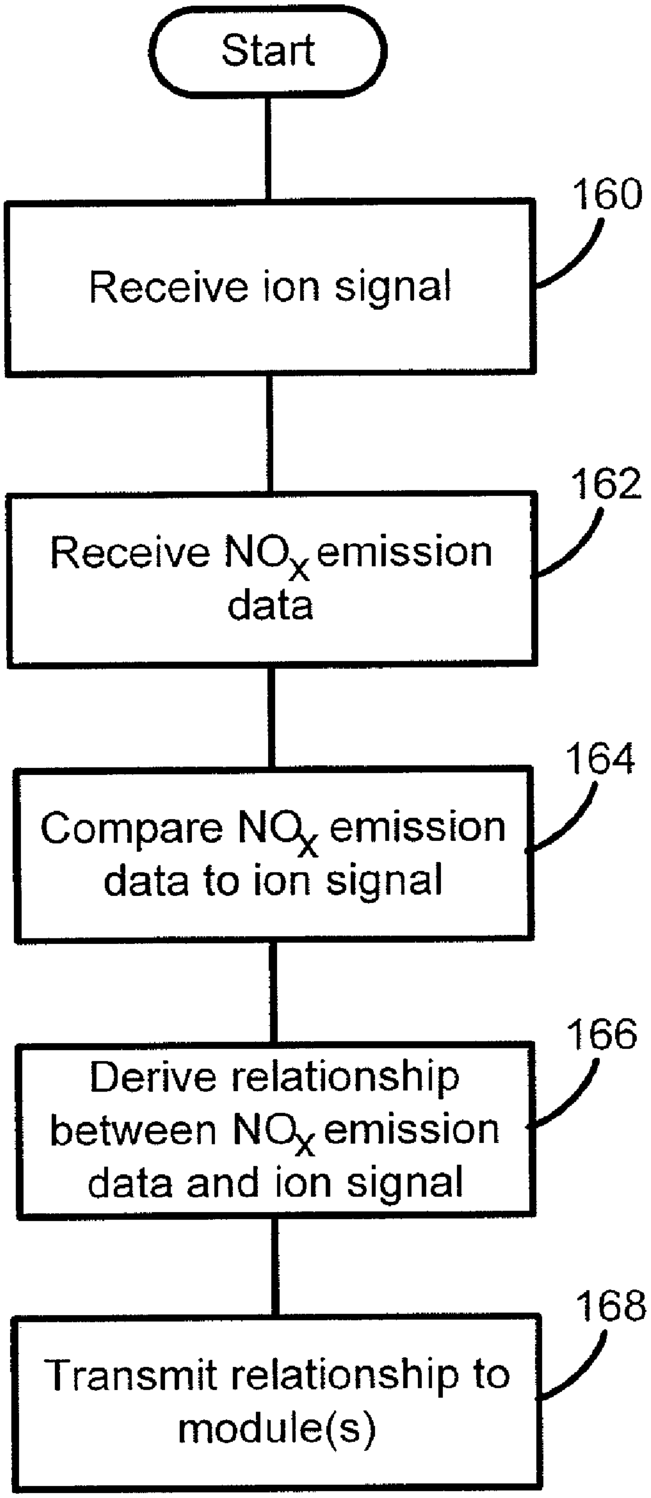
FIG. 5 is a flowchart illustrating the steps performed to derive the relationship between $NO_x$ emissions and ion current.

Turning now to FIG. 5, the steps to determine the relationship between the magnitude of the ion current peaks and the level of $NO_x$ emissions is shown. The ion current signal is received from an ion current sensor (step 160). The $NO_x$ engine out emissions is received from $NO_x$ standard emissions measuring equipment (step 162). The $NO_x$ emissions data and ion current signal are compared (step 164) and the relationship between $NO_x$ emissions and ion current is derived (step 166). The relationship can be derived by plotting the $NO_x$ emissions versus ion current magnitude and fitting a function through the data. The function may be a linear line, a piecewise linear line, a polynomial function, an exponential function, etc. The relationship is transmitted to the appropriate control modules (step 168), such as the ionization module 104, the ECU 106, etc.

Figure 6:
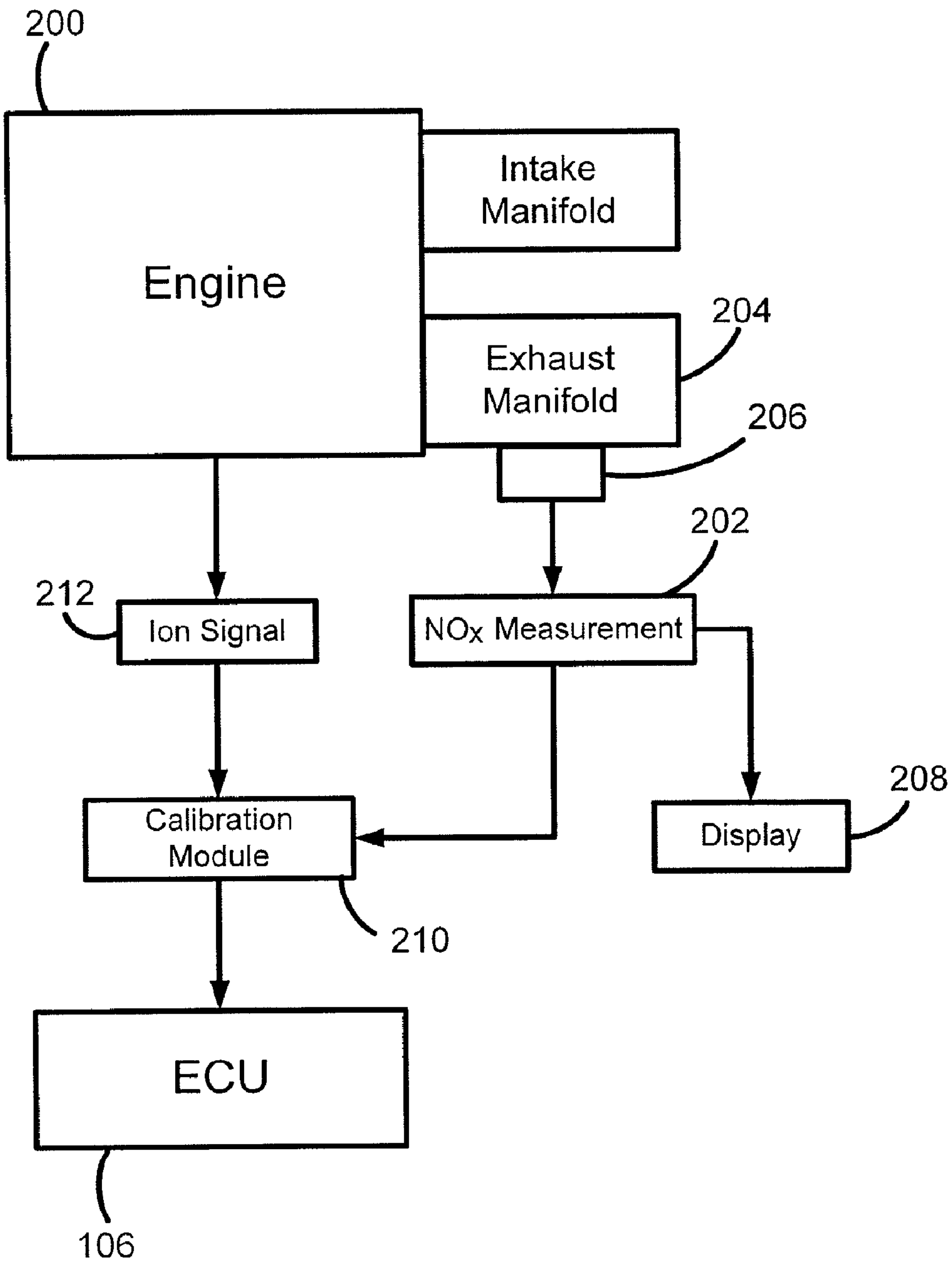
FIG. 6 is a block diagram schematic illustrating an embodiment of the components used to derive the relationship between $NO_x$ emissions and ion current.

FIG. 6 shows one implementation of calibrating the ion current signal. During operation of the engine 200, the $NO_x$ emission measuring instrument 202 draws a sample of the exhaust gases from exhaust manifold 204 through a sampling probe 206 and determines the $NO_x$ emissions and displays it on optional display unit 208. In one embodiment, the $NO_x$ emissions are determined in volume fraction in ppm (parts per million). The $NO_x$ emissions measuring instrument 202 sends the $NO_x$ data to the calibration module 210. For purposes of illustration, the calibration module 210 is shown as a separate component. The calibration module may be an independent module, part of the ionization module 102, or part of the ECU 106. The ion current signal 212 is produced by the ion probe, with its electrodes exposed to the combustion products in the combustion chamber 120 of the engine. The calibration module 210 receives the ion current signal 212 and a signal from the emissions measuring unit that measure the volume fraction of $NO_x$ in the exhaust of the cylinder. The calibration module 210 calibrates the ion current signal 212 with respect to the $NO_x$. Once the ion signal is calibrated at one operating condition, it can be used over the whole range of engine speeds, loads, and operating modes. The output of the calibration module 210 gives the relationship between $NO_x$ and ion current (e.g., volume fraction of $NO_x$ in ppm per unit and ion current), which is fed into the ECU 106 and is used in the control of the engine. The calibration module may also feed the output to other modules within the operating environment.

Figure 7:
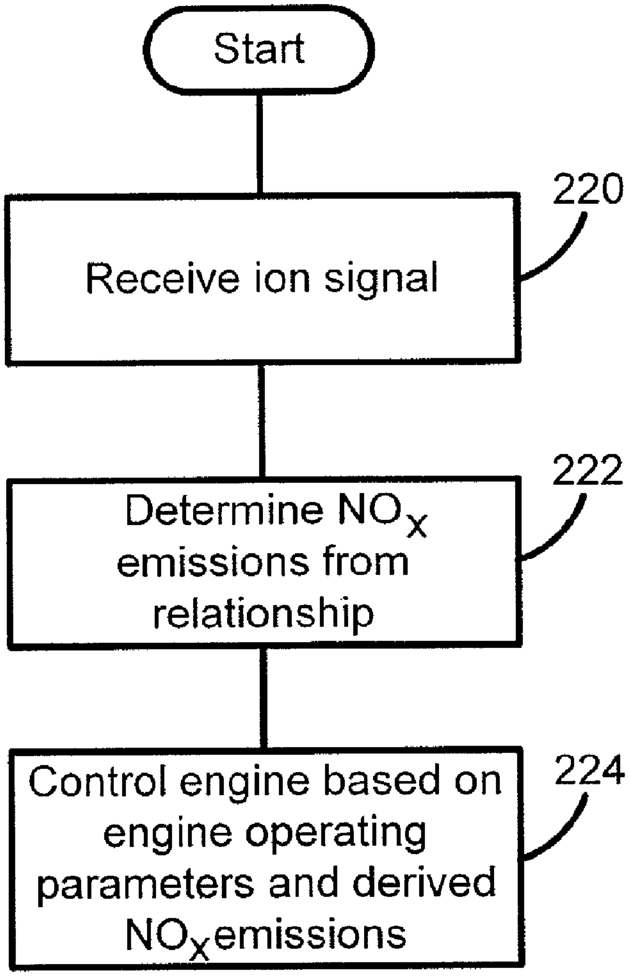
FIG. 7 is a flowchart illustrating the steps performed to determine $NO_x$ emissions based upon an ion signal during engine operation.
Figure 8:
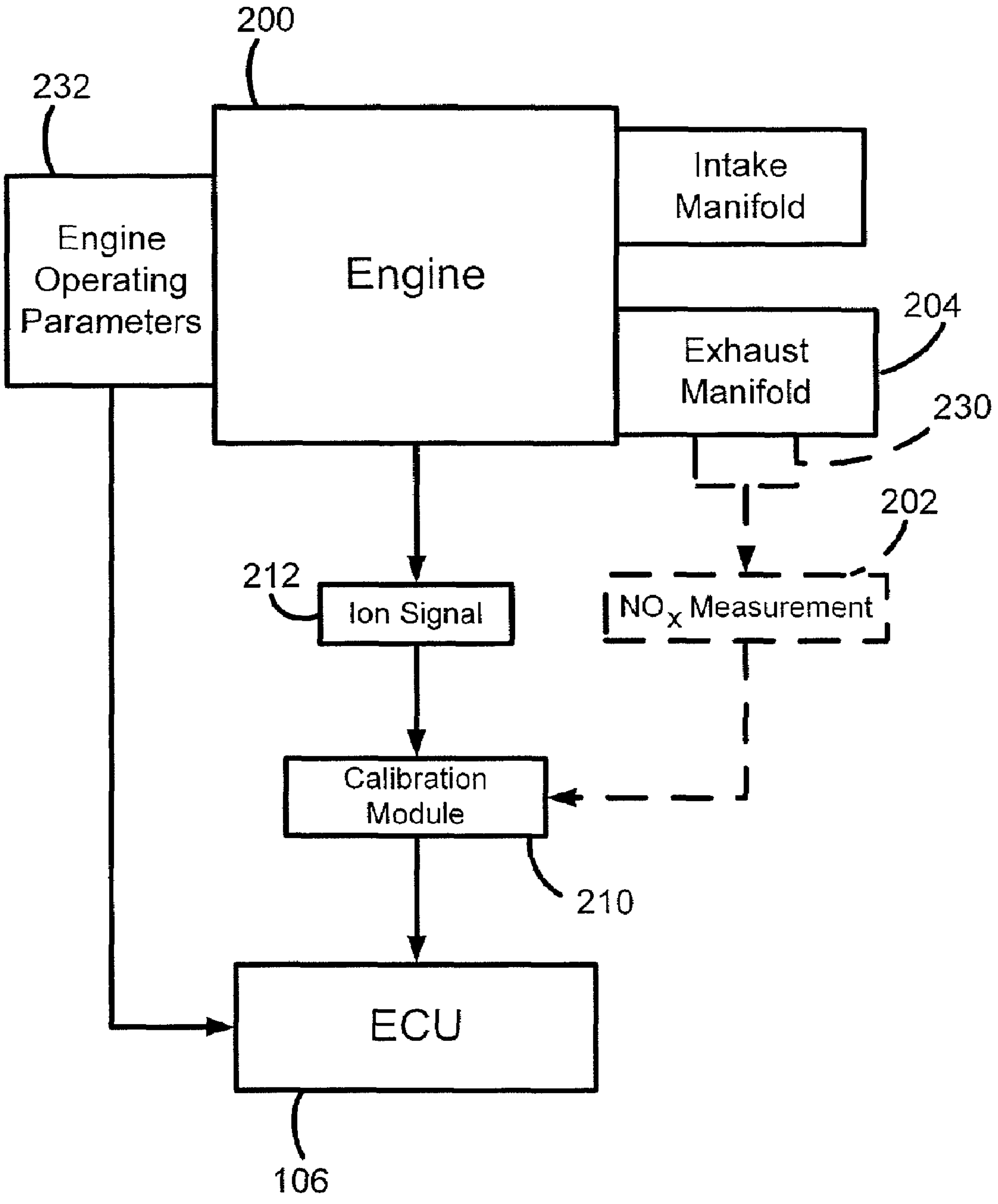
FIG. 8 is a block diagram schematic illustrating an embodiment of components used to control an engine based upon ion current and engine operating parameters.

Turning now to FIGS. 7 and 8, during operation, the ECU 106 receives the ion current signal (step 220), analyzes the ion current signal and determines the key combustion parameters such as the start of combustion, rate of heat release, maximum rate of heat release due the premixed combustion fraction, the minimum rate of heat release between the premixed combustion fraction and the mixing and diffusion controlled combustion fraction, the maximum rate of heat release due the mixing and diffusion controlled combustion fraction, and the rate of decay of the heat release during the expansion stroke. Based on this information, the ECU 106 is programmed to develop signals to the different actuators and control all the systems in the engine. The ECU 106, via the calibration module 210, determines the $NO_x$ emissions based upon the derived relationship (step 222), and in conjunction with engine operating parameters 220, controls operation of the engine 200 (step 224). The ECU 106 may control the engine to minimize $NO_x$ emissions, improve the trade-off between $NO_x$ and other emissions such as particulate matter, carbon monoxide, hydrocarbons, and aldehydes The ECU 106 may also use the calibrated signal to control the engine parameters and increase the engine power output and improve its efficiency. The ion current signal 212 can be from one cylinder or, alternatively, from the sum of the ion currents from all the cylinders in a multi-cylinder engine. In one embodiment, an exhaust sampling probe 206 is placed in the manifold of one of the cylinders or, alternatively, in the location where all the exhaust gases from the cylinders meet. The calibration module 210 can be used to update the $NO_x$ emissions—ion current relationship as the engine changes over time, as new components are added, etc.

Figure 9:
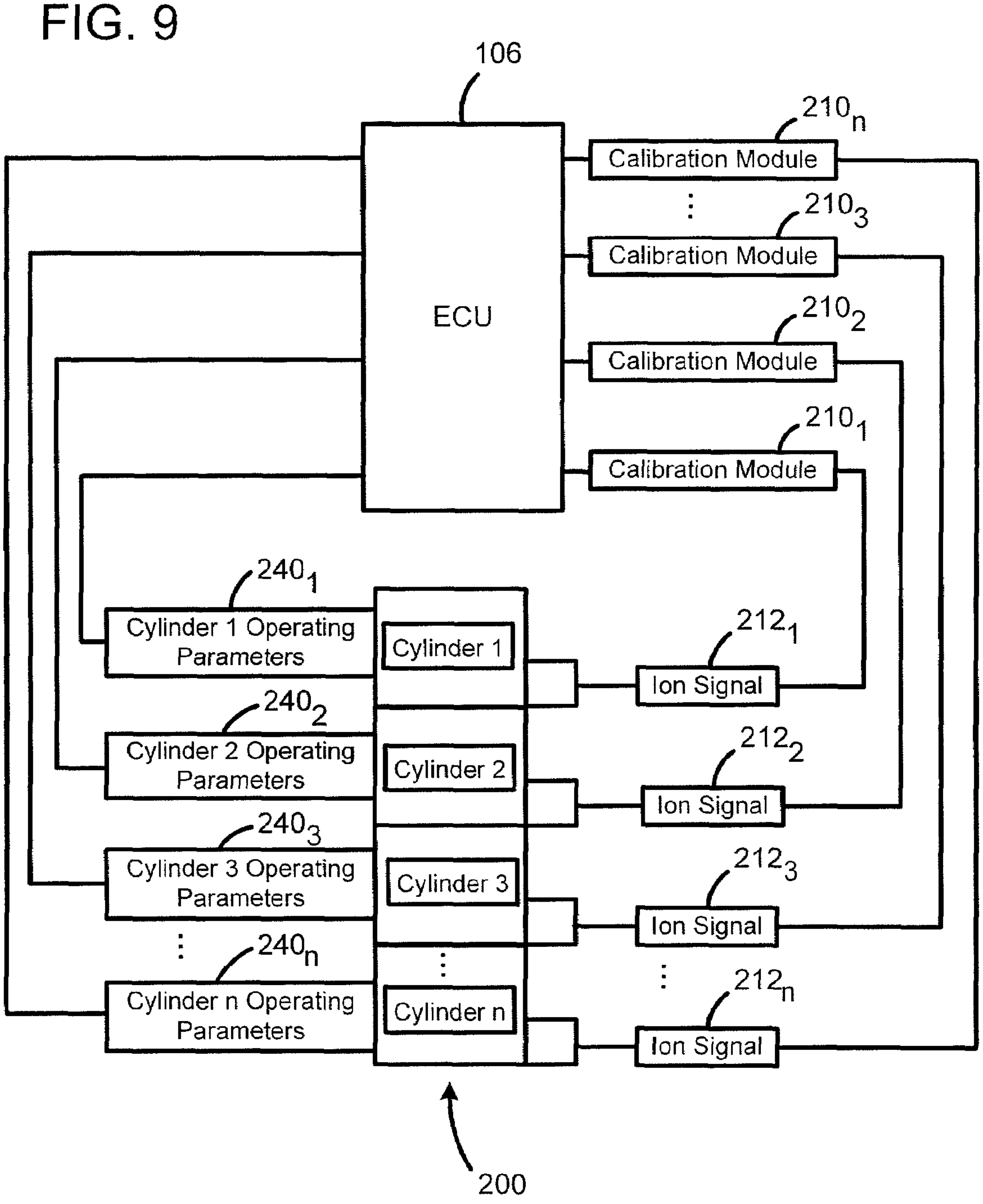
FIG. 9 is a block diagram schematic illustrating an embodiment of components used to calibrate ion current versus $NO_x$ emissions independently in each cylinder and control each cylinder independently.

Turning now to FIG. 9, the ECU 106 may control each cylinder of an engine 200 separately. The ion signal $\mathbf{212}_x$ from each cylinder is calibrated by calibration module $\mathbf{210}_x$ (where x indicates the cylinder number) and fed into the ECU 106 that controls the parameters for each of the cylinders independently of the other cylinders. The ECU 106 uses the calibration module output to determine the $NO_x$ in the corresponding engine cylinder (e.g., cylinder 1, cylinder 2, etc.) and in conjunction with each cylinder's operating parameters $\mathbf{240}_x$, controls operation of the specific cylinder. While x number of calibration modules are shown for clarity, the calibration modules may be in a single calibration module, part of the ionization module, part of the ECU 106, etc. The ECU 106 may control each cylinder to minimize $NO_x$ emissions, improve the trade-off between $NO_x$ and other emissions such as particulate matter, carbon monoxide, hydrocarbons, and aldehydes for each cylinder. The ECU 106 may control the whole engine to minimize $NO_x$ emissions, improve the trade-off between $NO_x$ and other emissions such as particulate matter, carbon monoxide, hydrocarbons, and aldehydes of the whole engine. For example, the output of the cylinders in a multi-cylinder diesel engine can be balanced by adjusting the fuel injection parameters in each cylinder. Such balancing improves the load distribution among the cylinders and improves the operation, fuel economy and engine emissions of the whole engine.

From the foregoing, it can be seen that a relationship between $NO_x$ emissions and ion current magnitudes can be determined and used in the control of diesel engines. The ion current is compared to measured $NO_x$ emissions to determine the relationship. The relationship is then used during operation by determining $NO_x$ emissions from the measured ion current.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to determine nitrogen oxide (NOx) emissions formed in a combustion chamber of a compression ignition engine comprising the steps of:

receiving an ion current signal indicating a concentration of ions in the combustion chamber;

determining the NOx emissions based upon a derived relationship between the ion current signal and the NOx emissions.

2. The method of claim 1 further comprising the steps of controlling the compression ignition engine based upon engine operating parameters and the derived NOx emissions.

3. The method of claim 1 further comprising the step of deriving the derived relationship between the ion current signal and the NOx emissions.

4. The method of claim 3 wherein the step of deriving the derived relationship comprises the steps of:

receiving an ion current signal from an ion current sensor;

receiving NOx emissions data from exhaust emissions measuring equipment;

comparing the ion current signal to the NOx emissions data; and fitting a function through the NOx emissions data and ion current data.

5. The method of claim 4 wherein the step of fitting a function through the NOx emissions data and the ion current signal comprises the steps of creating a plot of the NOx emissions versus ion current magnitude; and fitting a function through the plot.

6. The method of claim 5 wherein the step of fitting the function through the plot comprises fitting one of a linear function or a piecewise linear function through the plot.

7. The method of claim 5 wherein the step of fitting the function through the plot comprises fitting a mathematical function through the plot.

8. The method of claim 4 wherein the step of fitting the function comprises fitting a function that is a volume fraction of NOx per unit of ion current.

9. The method of claim 3 wherein the step of deriving the derived relationship between the ion current signal and the NOx emissions comprises the step of deriving the derived relationship with a calibration module that receives the NOx emissions from exhaust emissions measuring equipment and receives the ion current signal from ion current measuring means.

10. A computer-readable medium having computer executable instructions for performing the steps of claim 1.

11. The computer-readable medium of claim 10 having further computer-executable instructions for performing the step comprising controlling the compression ignition engine based upon engine operating parameters and the derived NOx emissions.

12. The computer-readable medium of claim 10 having further computer-executable instructions for performing the step of deriving the derived relationship between the ion current signal and the NOx emissions.

13. The computer-readable medium of claim 12 wherein the step of deriving the derived relationship comprises the steps of:

receiving an ion current signal from an ion current sensor;

receiving NOx emissions data from exhaust emissions measuring equipment;

comparing the ion current signal to the NOx emissions data; and fitting a function through the NOx emissions data and ion current data.

14. The computer-readable medium of claim 13 wherein the step of fitting a function through the NOx emissions data and the ion current signal comprises the steps of creating a plot of the NOx emissions versus ion current magnitude; and fitting a function through the plot.

15. The computer-readable medium of claim 14 wherein the step of fitting the function through the plot comprises fitting one of a linear function through the plot, a piece-wise linear function through the plot, or a form of a mathematical function through the plot.

16. The computer-readable medium of claim 13 wherein the step of fitting the function comprises fitting a function that is a volume fraction of NOx per unit of ion current.

17. The computer-readable medium of claim 12 wherein the step of deriving the derived relationship between the ion current signal and the NOx emissions comprises the step of deriving the derived relationship with a calibration module that receives the NOx emissions from exhaust emissions measuring equipment and receives the ion current signal from ion current measuring means.

18. The computer-readable medium of claim 10 wherein the compression ignition engine has a plurality of combustion chambers, the computer-readable medium having further computer-executable instructions for performing the steps comprising:

for each one of the plurality of combustion chambers, receiving an ion current signal indicating a concentration of ions inside the one of the plurality of combustion chambers;

determining the NOx emissions based upon a derived relationship between the ion current signal and the NOx emissions for each of the plurality of combustion chambers.

19. The computer-readable medium of claim 18 having further computer-executable instructions for performing the step comprising:

for each one of the plurality of combustion chambers:

controlling at least one engine parameter based upon the NOx emissions derived from the ion current signal from the one of the plurality of combustion chambers.

20. The computer-readable medium of claim 19 wherein the step of adjusting at least one engine parameter comprises the step of adjusting at least one of fuel injection parameters and at least one of cylinder operating parameters.

21. The computer-readable medium of claim 19 having further computer-executable instructions for performing the step comprising:

determining, for each one of the plurality of combustion chambers, a function that is a volume fraction of NOx per unit of ion current flowing in the one of the plurality of combustion chambers.

22. The computer-readable medium of claim 10 wherein the compression ignition engine has a plurality of combustion chambers, the computer-readable medium having further computer-executable instructions for performing the steps comprising:

for each one of the plurality of combustion chambers, receiving an ion current signal indicating a concentration of ions inside the one of the plurality of combustion chambers;

determining the NOx emissions based upon a derived relationship between the ion current signal from the plurality of combustion chambers and the NOx emissions for the plurality of combustion chambers.

23. The computer-readable medium of claim 22 having further computer-executable instructions for performing the step comprising:

for each one of the plurality of combustion chambers:

controlling at least one engine parameter based upon the NOx emissions derived from the ion current signals from the plurality of combustion chambers.

24. The computer-readable medium of claim 23 wherein the step of controlling at least one engine parameter comprises the step of controlling at least one of fuel injection parameters and at least one of cylinder operating parameters.

25. The computer-readable medium of claim 22 having further computer-executable instructions for performing the step comprising:

determining, for the whole engine, a function that is a volume fraction of NOx per unit of ion current flowing in the plurality of combustion chambers.

* * * * *

UNITED STATES PATENT AND TRADEMARK OFFICE

CERTIFICATE OF CORRECTION

PATENT NO. : 7,603,226 B2
APPLICATION NO. : 11/464232
DATED : October 13, 2009
INVENTOR(S) : Naeim A. Henein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this

Fifth Day of October, 2010

David J. Kappos

*Director of the United States Patent and Trademark Office*